(12) United States Patent
Huang et al.

(10) Patent No.: US 6,546,013 B1
(45) Date of Patent: Apr. 8, 2003

(54) METHOD AND APPARATUS FOR DELIVERING REFERENCE SIGNAL INFORMATION WITHIN A SPECIFIED TIME INTERVAL

(75) Inventors: Si Jun Huang, Suwanee, GA (US); Joel W. Schoenblum, Roswell, GA (US); Christopher H. Birch, Toronto (CA)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/235,855

(22) Filed: Jan. 22, 1999

Related U.S. Application Data

(63) Continuation-in-part of application No. 08/823,007, filed on Mar. 21, 1997, now Pat. No. 6,052,584.

(51) Int. Cl.[7] .............................. H04L 12/56; H04N 7/52
(52) U.S. Cl. ..................... 370/395.1; 370/517; 348/423
(58) Field of Search ........................... 370/395.1, 395.6, 370/503, 506, 508, 516, 517, 519, 471, 472, 473; 375/371, 372; 348/423, 432, 474, 497, 500

(56) References Cited

U.S. PATENT DOCUMENTS 5,652,627 A 7/1997 Allen
5,790,543 A 8/1998 Cloutier

OTHER PUBLICATIONS

Tryfonas et al, A Restamping Approach to Clock Recovery in MPEG–2 Systems Layer, UCSC–CRL–98–4, pp. 1–27, May 4, 1998.*

ISO/IEC 13818–1, Generic Coding of Moving Pictures and Associated Audio: Systems Recommendation H.222.0, pp. 1–141, Nov. 13, 1994.*

* cited by examiner

*Primary Examiner*—Dang Ton
*Assistant Examiner*—Frank Duong
(74) *Attorney, Agent, or Firm*—Hubert J. Barnhardt, III; Kenneth M. Massaroni; Shelley L. Couturier

(57) ABSTRACT

Variable rate multiplexer devices have, by definition, a variable output rate for bits of information encoded therein. As a result necessary time sync information such as program clock reference information cannot be guaranteed to be delivered within the time interval thresholds mandated by certain industry broadcast standards, such as MPEG-2 and digital video broadcast ("DVB"). Transmission of reference signals, such as PCR information, may be assured by inserting detection means to detect the time interval between occurrences of the reference signal. If the interval between occurrences of the reference signal exceeds a predetermined time interval threshold, the detection means will instruct a memory device to provide a reference signal, which is then imprinted with reference signal information and inserted into the stream of information being output by the multiplexer. Alternatively, the multiplexer may simply provide an output signal at a preset predetermined time intervals, regardless of whether or not a reference signal is being provided by the input stream. In this embodiment, the output signal may occur substantially more frequently than is required by the time interval threshold of the relevant broadcast standard.

30 Claims, 4 Drawing Sheets

METHOD AND APPARATUS FOR DELIVERING REFERENCE SIGNAL INFORMATION WITHIN A SPECIFIED TIME INTERVAL

CROSS REFERENCE TO RELATED APPLICATIONS

This application is a continuation in part application of U.S. application Ser. No. 08/823,007, filed Mar. 21, 1997, now U.S. Pat. No. 6,052,584 issued Apr. 18, 2000 by Huang, et al, entitled "Using a Receiver Model to Multiplex Variable-Rate Bit Streams Having Timing Constraints," and assigned to Scientific-Atlanta, Inc.

FIELD OF THE INVENTION

The invention relates in general to the transmission of variable-rate bit streams and more particularly to the delivery of reference signal information in said bit streams within a specified time interval.

BACKGROUND OF THE INVENTION

A new problem in data transmission is the transmission of data that requires a high bandwidth, is bursty, and has temporal constraints. Traditionally, data transmission has been done on the public switched networks provided by the telephone companies or on packet networks. The public switched networks are designed for interactive voice applications, and so provide relatively low-bandwidth circuits that satisfy stringent temporal constraints. The packet networks are designed for the transfer of data between computer systems. The only constraint is that the data eventually arrive at its destination. The amount of bandwidth available for a transfer depends on the degree of congestion in the network. The packet networks thus typically make no guarantees about when or even in what order the data in a burst of data will arrive at its destination.

It may thus be appreciated that neither the telephone network nor the packet network is well-adapted to handle high-bandwidth, bursty data with time constraints. An example of such data is digital television which has been compressed according to the Motion Picture Experts Group ("MPEG") MPEG-2 standard, otherwise set forth in ISO/IEC 13818-1 and 13818-2.

Referring now to FIG. 1 there is illustrated therein those details of the MPEG-2 standard that enable one skilled in the art to understand the present invention. It is to be understood, however, that the instant invention as described hereinafter is not so limited, and will work with other data compression techniques. The MPEG-2 standard defines an encoding scheme for compressing digital representations of video. The encoding scheme takes advantage of the fact that video images generally have large amounts of spatial and temporal redundancy. There is spatial redundancy because a given video picture has sections where the entire area has the same appearance; the larger the areas and the more of them there are, the greater amount of spatial redundancy in the image. There is temporal redundancy because there is often not much change between a given video image and the ones that precede and follow it in a sequence. The less the amount of change between two video images, the greater the amount of temporal redundancy. The more spatial redundancy there is in an image and the more temporal redundancy there is in the sequence of images to which the image belongs, the fewer the bits of information that will be needed to represent the image.

Maximum advantage for the transmission of images encoded using the MPEG-2 standard is obtained if the images can be transmitted at variable bit rates. The bit rates can vary because the rate at which a receiving device receives images is constants while the images have a varying number of bits. A complex image therefore requires a higher bit rate than a simple image, and a sequence of MPEG images transmitted at variable bit rates is a variable-rate bit stream with time constraints. For example, a sequence of images that shows a news anchorperson in front of a solid color background will have much more spatial and temporal redundancy than a sequence of images for a commercial or MTV song presentation, and the bit rate for the images showing the news anchor will be far lower than the bit rate for the images of the MTV song presentation.

The MPEG-2 compression scheme presents a sequence of video images as a sequence of compressed pictures, each of which must be decoded at a specific time. There are three ways in which pictures may be compressed. One way is intra-coding, in which the compression is done without reference to any other picture. This encoding technique reduces spatial redundancy but not time redundancy, and the pictures resulting from it are generally larger than those in which the encoding reduces both spatial redundancy and temporal redundancy. Pictures encoded in this way are called I-pictures. A certain number of I-pictures are required in a sequence, first, because the initial picture of a sequence is necessarily an I-picture, and second, because I-pictures permit recovery from transmission errors.

Time redundancy is reduced by encoding pictures as a set of changes from earlier or later pictures or both. In MPEG-2, this is done using motion compensated forward and backward predictions. When a picture uses only forward motion compensated prediction, it is called a Predictive-coded picture, or P picture. When a picture uses both forward and backward motion compensated predictions, it is called a bi-directional predictive-coded picture, or a B picture in short. P pictures generally have fewer bits than I-pictures and B pictures have the smallest number of bits. The number of bits required to encode a given sequence of pictures in MPEG-2 is thus dependent on the distribution of picture coding types mentioned above, as well as the picture content itself As will be apparent from the foregoing discussion, the sequence of pictures required to encode the images of the news anchorperson will have fewer and smaller I-pictures and smaller B and P pictures than the sequence required for the MTV song presentation, and consequently, the MPEG-2 representation of the images of the news anchorperson will be much smaller than the MPEG-2 representation of the images of the MTV sequence.

The MPEG-2 pictures are being received by a low-cost consumer electronics device such as a digital television set or a set-top box provided by a cable television ("CATV") service provider. The low cost of the device strictly limits the amount of memory available to store the MPEG-2 pictures. Moreover, the pictures are being used to produce moving images. The MPEG-2 pictures must consequently arrive in the receiver in the right order and with time intervals between them such that the next MPEG-2 picture is available when needed and there is room in the memory for the picture which is currently being sent. In the art, a memory which has run out of data is said to have underflowed, while a memory which has received more data than it can hold is said to have overflowed. In the case of underflow, the motion in the TV picture must stop until the next MPEG-2 picture arrives, and in the case of overflow, the data which did not fit into memory is simply lost.

FIG. 1 is a representation of a system 10 including digital picture source 12 and a television 14 that are connected by a channel 16 that is carrying a MPEG-2 bit stream representation of a sequence of TV images. The digital picture source 12 generates uncompressed digital representations ("UDR") of images 18, which go to variable bit rate ("VBR") encoder 20. Encoder 20 encodes the uncompressed digital representations to produce variable rate bit stream ("VRBS") 22. Variable rate bit stream 22 is a sequence of compressed digital pictures 24 of variable length. As indicated above, when the encoding is done according to the MPEG-2 standard, the length of a picture depends on the complexity of the image it represents and whether it is an I-picture, a P picture, or a B picture. Additionally, the length of the picture depends on the encoding rate of VBR encoder 20. That rate can be varied. In general, the more bits used to encode a picture, the better the picture quality.

The variable rate bit stream 22 is transferred via channel 16 to VBR decoder 26, which decodes the compressed digital pictures 24 to produce uncompressed digital pictures 105. These in turn are provided to television 117. If television 117 is a digital television, they will be provided directly; otherwise, there will be another element which converts uncompressed digital pictures ("UDP") 28 into standard analog television signals and then provides those signals to television 14. There may of course be any number of VBR decoders 26 receiving the output of a single encoder 20.

In FIG. 1, channel 16 transfers bit stream 22 as a sequence of packets 30. The compressed digital pictures 24 thus appear in FIG. 1 as varying-length sequences of packets 30. Thus, picture 24(a) may have "n" packets while picture 24(d) has "k" packets. Included in each picture 24 is timing information 32. Timing information contains two kinds of information: clock information and time stamps. Clock information is used to synchronize decoder 26 with encoder 20. The time stamps include the Decoding Time Stamp ("DTS") which specifies when a picture is to be decoded and the Presentation Time Stamp ("PTS") which specifies when the picture is actually to be displayed. The times specified in the time stamps are specified in terms of the clock information. As indicated above, VBR decoder 26 contains a relatively small amount of memory for storing pictures 30 until they are decoded and provided to TV 14. This memory is shown at 34 in FIG. 1 and will be referred to hereinafter as the decoder's bit buffer. Bit buffer 34 must be at least large enough to hold the largest possible MPEG-2 picture. Further, channel 16 must provide the pictures 24 to bit buffer 34 in such fashion that decoder 26 can make them available at the proper times to TV 14 and that bit buffer 34 never overflows or underflows. Bit buffer 34 underflows if not all of the bits in a picture 24 have arrived in bit buffer by the time specified in the picture's time stamp for decoder to begin decoding the picture.

Providing pictures 24 to VBR decoder 26 in the proper order and at the proper times is made more complicated by the fact that a number of channels 16 may share a single very high bandwidth data link. For example, a CATV provider may use a satellite link to provide a large number of TV programs from a central location to a number of CATV network head ends, from which they are transmitted via coaxial or fiber optic cable to individual subscribers or may even use the satellite link to provide the TV programs directly to the subscribers. When a number of channels share a medium such as a satellite link, the medium is said to be multiplexed among the channels.

FIG. 2 shows such a multiplexed medium. A number of channels 16(0) through 16(n) which are carrying packets containing bits from variable rate bit streams 22(0 ... n) are received in multiplexer 40, which processes the packets as required to multiplex them onto high bandwidth ("HBW") medium 42. The packets then go via medium 42 to demultiplexer 44, which separates the packets into the packet streams for the individual channels 16(0 ... n). A simple way of sharing a high bandwidth medium among a number of channels that are carrying digital data is to repeatedly give each individual channel 16 access to the high bandwidth medium for a short period of time, referred to hereinafter as a slot.

One way of doing this is shown at 50 in FIG. 2. The short period of time appears at 50 as a slot 52; during a slot 52, a fixed number of packets 32 belonging to a channel 16 may be output to medium 42. Each channel 16 in turn has a slot 52, and all of the slots taken together make up a time slice 54. When medium 42 is carrying channels like channel 16 that have varying bit rates and time constraints, slot 52 for each of the channels 16 must output enough packets to provide bits at the rate necessary to send the largest pictures to channel 16 within channel 16's time, overflow, and underflow constraints. Of course, most of the time, a channel's slot 52 will be outputting fewer packets than the maximum to medium 42, and sometimes may not be carrying any packets at all. Since each slot 52 represents a fixed portion of medium 42's total bandwidth, any time a slot 52 is not full, a part of medium 42's bandwidth is being wasted.

In order to avoid wasting the medium bandwidth, a technique is used which ensures that each time slice is generally almost full of packets. This technique is termed statistical multiplexing. It takes advantage of the fact that at a given moment in time, each of the channels in a set of channels will be carrying bits at a different bit rate, and the medium bandwidth need only be large enough at that moment of time to transmit what the channels are presently carrying, not large enough to transmit what all of the channels could carry if they were transmitting at the maximum rate. The output of the channels is analyzed statistically to determine what the actual maximum rate of output for the entire set of channels will be and the medium bandwidth is sized to satisfy that actual peak rate. Typically, the bandwidth that is determined in this fashion will be far less than is required for multiplexing in the manner shown at 50 in FIG. 2. As a result, more channels can be sent in a given amount of bandwidth. At the level of slots, what statistical multiplexing requires is a mechanism which in effect permits a channel to have a slot in time slice 54 which varies in length to suit the actual needs of channel 16 during that time slice 54. Such a time slice 54 with varying-length slots 56 is shown at 55.

Methods of statistically multiplexing bit streams are disclosed in, for example, U.S. Pat. No. 5,506,844, entitled, Method for Configuring a Statistical Multiplexer to Dynamically Allocate Communication Channel Bandwidth, to Rao, issued Apr. 9, 1996; and U.S. patent application Ser. No. 08/823,007 entitled Using a Receiver Model to Multiplex Variable Rate Bit Streams Having Timing Constraints, filed Mar. 21, 1997, the disclosures of each of which are incorporated herein by reference.

Unlike the variable bit rate ("VBR") multiplexers described herein above, prior art multiplexers encoded information at a constant bit rate ("CBR"). By constant bit rate it is meant that the same number of bits of information were encoded and output per each similar time unit. Conversely in VBR, more or less bits of information may be encoded and transmitted per unit of time. Accordingly, program clock reference information ("PCR") necessary to assure that both the encoder and decoder are synchronized for proper decoding and presentation of video information could be, under a CBR format, transmitted at regular intervals. These regular intervals allow the decoder to look for PCR information in the bit stream in a timely manner. For example, the time interval specified by the Digital Video Broadcast (DVB) standard, as well as others, is typically on the order of approximately 40 milliseconds.

However, when the MPEG/DVB compliant bit stream goes through the statistical multiplexing operation in the method disclosed in the patent application entitled "Using a Receiver Model to Multiplex Variable-Rate Bit Streams Having Timing Constraints," the bit delivery time schedule is changed due to the buffering mechanism and also due to the inter-channel multiplexing process. This results in PCR interval variation from the original input bit stream. When packets are delivered faster than the speed it arrives at the buffer, the PCR interval is squeezed, i.e., shortened. When packets are delivered slower than the speed at which it arrives at the buffer, the PCR interval is stretched, i.e., lengthened. The later case will generate a muxed output bit stream that would violate the MPEG/DVB specifications on the PCR time interval, which will result in lost or erroneous video information.

Accordingly, there exists a need for a method and apparatus which will assure delivery of PCR information within the time interval threshold required standards currently employed. The method and apparatus must take into account that the bit streams may be output at variable rates, and hence PCR information packets while being generated at uniform time intervals, are not necessarily transmitted or output to decoders in uniform time intervals. Accordingly, the method and apparatus must assure that some PCR information is transmitted or output to decoders at intervals which are less than the time interval threshold required for the standard.

DETAILED DESCRIPTION OF THE PREFERRED EMBODIMENT

Figure 1:
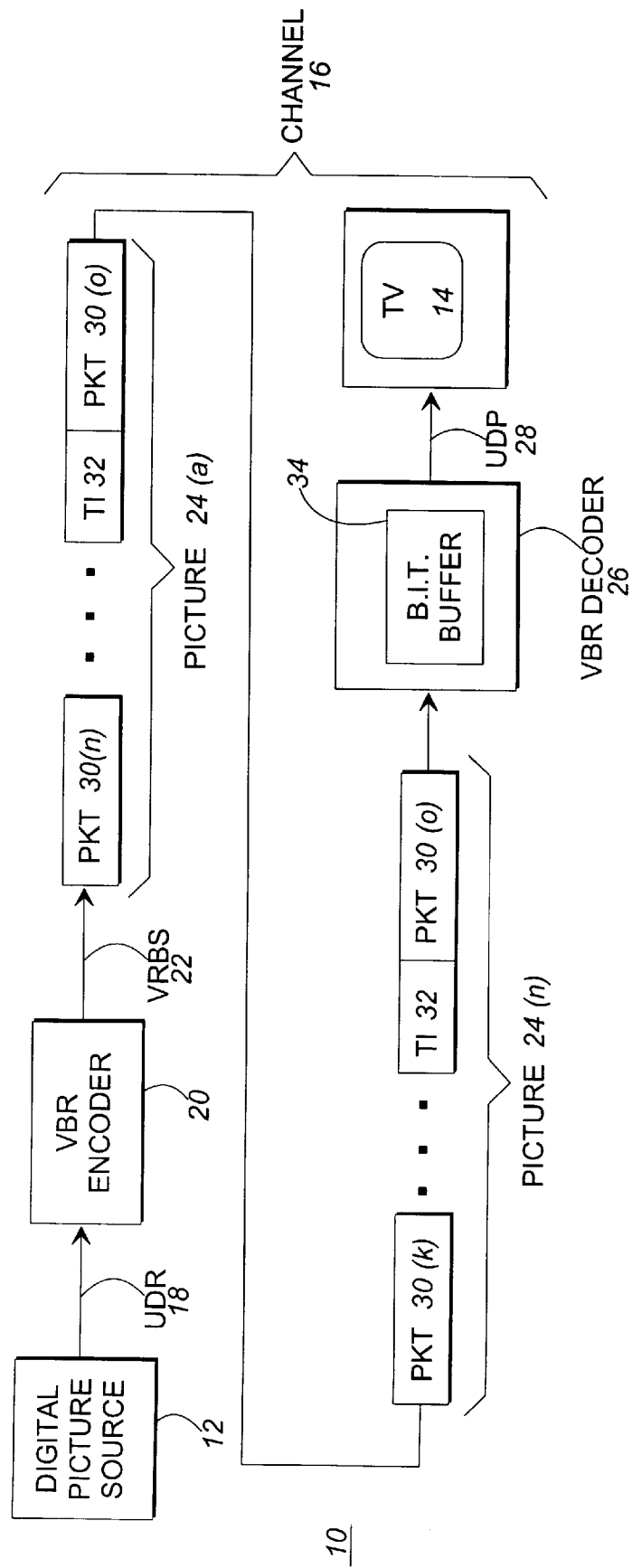
FIG. 1 is a block diagram illustrating how digital television pictures are encoded, transmitted, and decoded.
Figure 2:
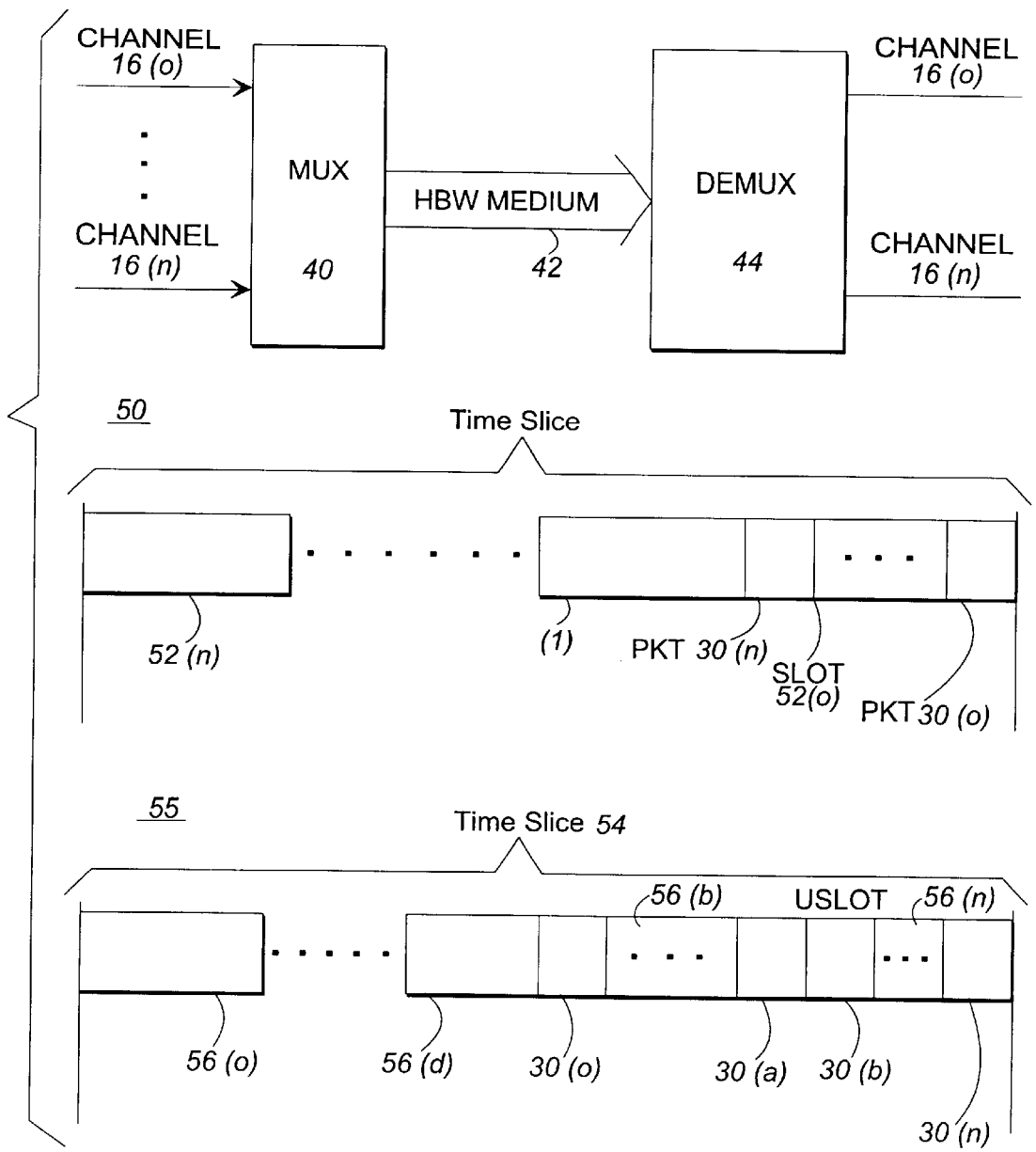
FIG. 2 is a block diagram showing multiplexing of variable-rate bit streams onto a high band width medium.

While the specification concludes with claims defining the features of the invention that are regarded as novel, it is believed that the invention will be better understood from a consideration of the following description in conjunction with the drawing figures, in which like reference numerals are carried forward.

At its simplest, the invention relates to the ability to look ahead "n" time slices to see whether or not the system will have sufficient bandwidth to accommodate the video information that will need to be output. The process described hereinbelow looks at the relative space needs per channel and allocates bits (n MPEG packets) as required. By looking a sufficient number of time slices into the future, panic conditions, i.e., a condition in which bandwidth requisites will exceed bandwidth availability, can be identified. Once identified, such conditions may be avoided by looking for opportunities to insert glue pictures.

Figure 3:
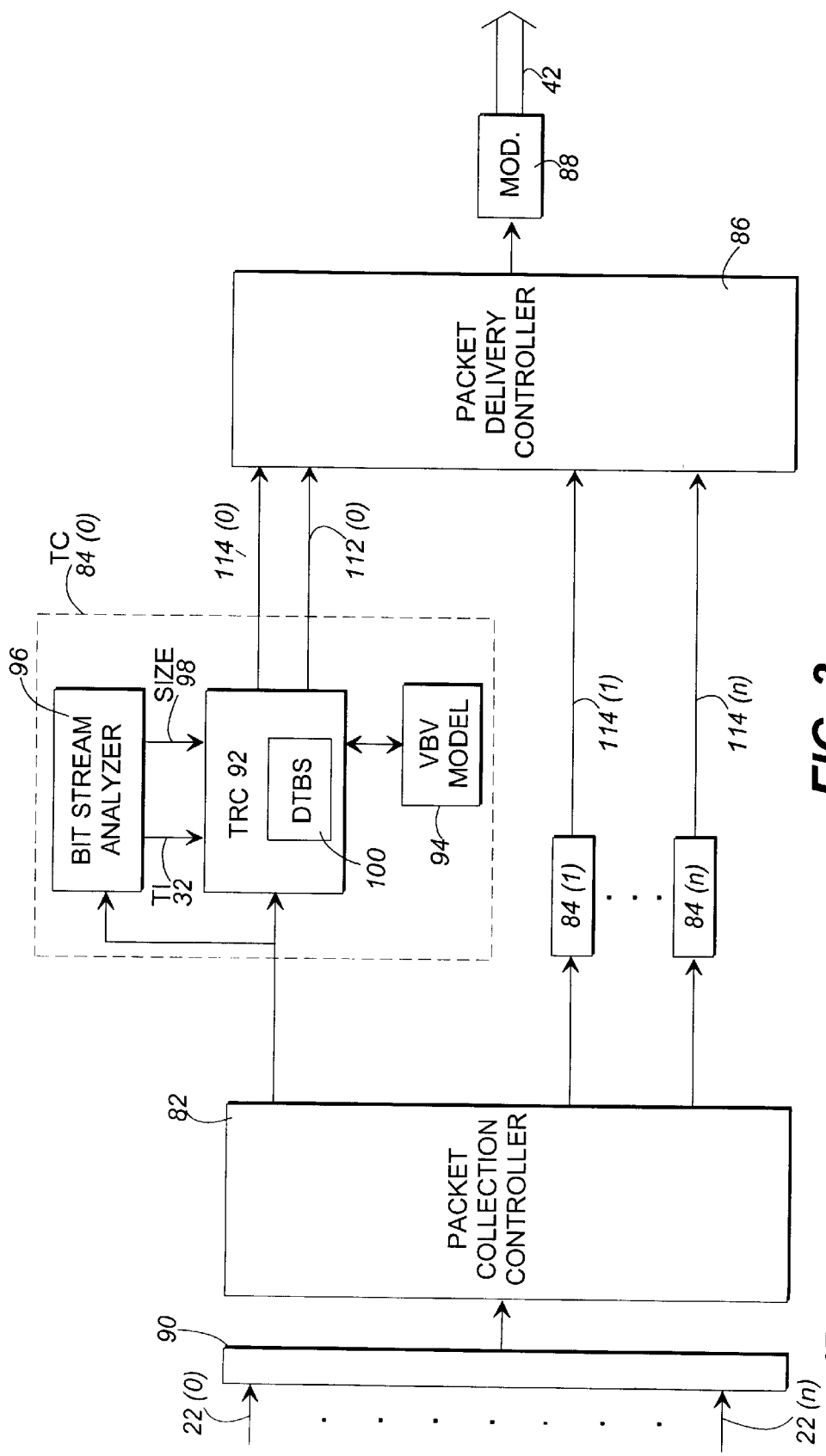
FIG. 3 is a block diagram of a statistical multiplexer which implements a preferred embodiment of the invention.

Referring now to FIG. 3, there is illustrated therein a block diagram of a statistical multiplexer which implements a preferred embodiment of the invention. FIG. 3 illustrates an overview of a statistical multiplexer 80 for MPEG-2 bit streams which is implemented according to the principles of the invention. The main components of multiplexer 80 are packet collection controller 82, a transmission controller ("TC") 84($i$) for each variable-rate bit stream 22($i$), a packet delivery controller 86, and a modulator 88, which receives the output of packet delivery controller 86 and outputs it in the proper form for transmission medium 42. Packet collection controller 82 collects packets from variable-rate bit streams 22(0 . . . n) and distributes the packets that carry a given bit stream 22($i$) to the bitstream's corresponding transmission controller 84($i$). In the preferred embodiment, the packets for all of the bit streams 22(0 . . . n) are output to bus 90. Each packet contains an indication of which bit stream it belongs to, and packet collection controller responds to the indication contained in a packet by routing it to the proper transmission controller 84($i$). It should be noted here that the packets in each bit stream 22($i$) arrive in transmission controller 84($i$) in the order in which they were sent by encoder 20($i$).

Transmission controller 84($i$) determines the rate at which packets from its corresponding bit stream 22($i$) is output to medium 42. The actual rate determination is made by transmission rate controller ("TRC") 92, which at a minimum, bases its determination on the following information: for at least a current picture 24 in bit stream 22($i$), the timing information 32 and the size of the current picture. A Video Buffer Verifier (VBV) model 94($i$), which is a model of a hypothetical bit buffer 34($i$). VBV model 94($i$) uses the timing information and picture size information to determine a range of rates at which bit stream 22($i$) must be provided to the decoder's bit buffer 34($i$) if bit buffer 34($i$) is to neither overflow nor underflow. Transmission rate controller 92($i$) provides the rate information to packet delivery controller 86, which uses the information from all of the transmission controllers 84 to determine during each time slice how the bandwidth of transmission medium 42 should be allocated among the bit streams 22 during the next time slice. The more packets a bit stream 22($i$) needs to output during a time slice, the more bandwidth it receives for that time slice.

Continuing in more detail, transmission controller 84 obtains the timing and picture size information by means of bit stream analyzer 96, which reads bit stream 22($i$) as it enters transmission controller 84 and recovers the timing information 32 and the picture size 98 from bit stream 22($i$). Bit stream analyzer 96 can do so because the MPEG-2 standard requires that the beginning of each picture 24 be marked and that the timing information 32 occupy predetermined locations in each picture 24. As previously explained, timing information 32 for each picture 24 includes a clock value and a decoding time stamp ("DTS"). Transmission controller 84($i$) and later decoder 26($i$) use the clock value to synchronize themselves with encoder 20($i$). The timing information in found in the header of the Pocketsized Elementary Stream ("PES") packet that encapsulates the compressed video data. The information is contained in the PTS and DTS time stamp parameters of the PES header. The MPEG-2 standard requires that a time stamp be sent at least every 700 milliseconds (msec). If a DTS is not explicitly sent with a compressed picture, then the decoding time can be determined from parameters in the Sequence and Picture headers, or extrapolated from the DTS value of a previously transmitted picture. For details, see Annex C of ISO/IEC 13818-1. Bit stream analyzer 96 determines the size of a picture simply by counting the bits (or packets) from the beginning of one picture to the beginning of the next picture.

The timing information and the picture size are used in VBV model 94(i). VBV model 94(i) requires the timing information and picture size information for each picture in bit stream 22(i) from the time the picture enters multiplexer 80 until the time the picture is decoded in decoder 26(i). A DTS buffer 100 which is designed to store DTS values of incoming pictures must be large enough to hold the timing information for all of the pictures required for the model. It should be noted here that VBV model 94(i)'s behavior is defined solely by the semantics of the MPEG-2 standard, not by any concrete bit buffer 34(i). This guarantees the bit stream generated by the Statistical Multiplexer described herein will be decodable by any compliant MPEG-1 video decoder that has a defined minimal recovery bit buffer. Given this minimum buffer size, the timing information for the pictures, and the sizes of the individual pictures, VBV model 94(i) can determine a rate of output for bit stream 22(i) which will guarantee for bit buffers 34(i) of any working MPEG-2 decoder that each picture arrives in the bit buffer 34(i) before the time it is to be decoded and that there will be no overflow nor underflow of bit buffer 34(i).

Figure 4:
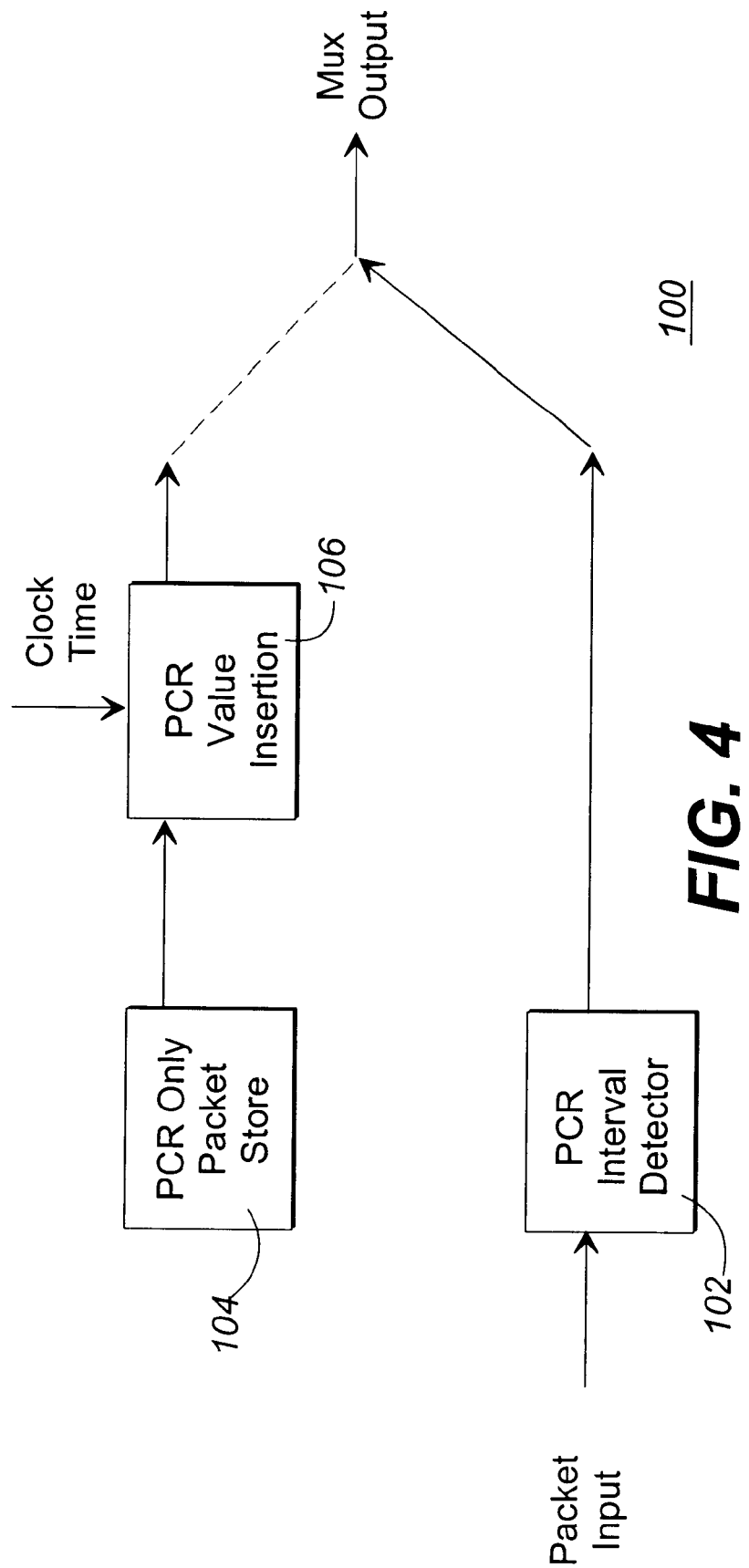
FIG. 4 is a more detailed block diagram of a part of the statistical multiplexer of FIG. 3.

Referring now to FIG. 4 there is illustrated therein a preferred embodiment of the program clock reference information insertion device 100 of the instant invention. As illustrated in FIG. 4, the circuit for inserting PCR information into the bit stream is disposed on the output side of the memory buffer of the device illustrated in, for example, FIG. 3. Each such PCR information insertion circuit is provided for each variable rate bit stream 22(i) . . . (n) so that each bit stream is assured of having a PCR packet delivered within a time interval. The PCR information insertion circuit comprises a PCR interval detector 102 which is operatively disposed in the output stream from the memory buffer and VBV of each of the output data streams of the multiplexer. The purpose of the PCR interval detector 102 is to detect the presence of a reference signal, such as the PCR information, in the outgoing bit stream and, once detected, the PCR interval detector must then determine the time interval between the last received packet of PCR information and the current time. If the interval is greater than a predetermined/predefined time interval threshold, then the output bit stream will not include the necessary PCR information so that an MPEG-2 compliant decoder receives the necessary frequent clock resync from the input source. If the PCR interval detector detects the presence of the PCR information packet regularly being transmitted in less than the predetermined time interval threshold, then the PCR interval detector has no function.

If however the PCR interval detector fails to detect the presence of a PCR information packet in less than the predetermined time interval threshold, then the PCR interval detector instructs memory device 104 to provide a PCR only packet for insertion into the outgoing bit stream. PCR only packets are constructed at initialization of the multiplexer and are stored in PCR only packets storage 104. The stored PCR only packets are constructed so as to have PCR values set at zero as default. Upon receipt from the PCR interval detector 102 to provide a PCR only packet, the PCR only packet storage 104 provides a PCR only packet to a PCR value insertion device 106. The PCR value insertion device 106 may be a time stamp device that takes a time value read from the device's current local clock time, and which puts the time value into the proper place of the PCR-only packet.

The PCR value insertion device 106 is operatively coupled to the clock device of the multiplexer. Accordingly, the PCR value insertion device 106 has local clock information, with which the PCR value is modified with the current time read from the local clock. Accordingly, the PCR only information is the current clock time read from the local clock, which information is imprinted upon the PCR packet to be inserted into the bit stream output. Thereafter, the PCR only packet with the current PCR information inserted via the PCR value insertion device 106 is inserted into the outgoing bit stream and transmitted to the decoder so that a PCR information packet is received within the time frame specified by the relevant broadcast standard.

Alternatively, delivery of PCR information within an interval required by the relevant broadcast standard may be assured even without the use of PCR interval detector 102 of FIG. 4. In the alternative embodiment, a PCR only packet is provided by PCR only packet storage device 104 and imprinted with current PCR value information by PCR value insertion device 106 at regular time intervals. This imprinted PCR only packet is then inserted into the output of the multiplexer at regular time intervals of $T_{PCR}$ packet milliseconds. The value of $T_{PCR}$ packet will vary with the type of broadcast standard being employed. For example, in the DVB standard, the $T_{PCR}$ packets will be less than or equal to 40 milliseconds.

It is to be understood that this alternate method does come with some sacrifice in terms of output bandwidth. Specifically, in the first embodiment described hereinabove, PCR information only packets are inserted only in those instances in which they are absolutely necessary, i.e., those instances in which a PCR packet is required due to the fact that the interval exceeds the time interval threshold. Accordingly, one packet containing PCR information is inserted within the time interval threshold, as PCR information only packets are only inserted in those times in which the interval is exceeded. Conversely, in the alternative embodiment described herein, a PCR only packet is inserted every 40 milliseconds, regardless of whether or not a packet including PCR information was already transmitted during the time interval. This slight sacrifice in output bandwidth is offset by the fact that the alternative embodiment does not require the presence of the PCR interval detector.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An apparatus for ensuring the delivery of a reference signal within a bit stream, said apparatus comprising:
    detector means for detecting the presence of said reference signal in said bit stream, and measuring a time interval between occurrences of said reference signal;
    storage means for storing a pre-defined packet bearing an reference signal value;
    program clock reference signal insertion means for stamping a local clock counter value to said pre-defined packet bearing a reference signal value; and
    multiplexer means for injecting the pre-defined packet with said local clock counter value into said input bit stream.

2. An apparatus as in claim 1, wherein said bit stream is a sequence of packets, each packet being a fixed length byte sequence.

3. An apparatus as in claim 2, wherein said packets are representation of digitally encoded video images.

4. An apparatus as in claim 2, wherein said reference signal is a program clock reference signal.

5. An apparatus as in claim 1, wherein said pre-defined packet bearing a reference signal value includes only said reference signal.

6. An apparatus as in claim 1, wherein said program clock reference insertion means stamps the current local clock counter value to the said pre-defined packet.

7. An apparatus as in claim 1, wherein said program clock reference interval detector further comprises:

measuring means for measuring the program clock reference value difference between successive program clock reference bearing packets; and control means to send a control signal for program clock reference value stamping and a control signal for injecting a program clock reference only packet into the output bit stream at a time commanded by said detector means.

8. An apparatus as in claim 7, wherein said control means injects a program clock reference only packet when the time interval is greater than a pre-defined time interval.

9. An apparatus as in claim 8, wherein said time interval is less than 40 milliseconds.

10. A method for assuring delivery of a reference signal with a predefined time interval threshold in a bit stream which is output at a variable rate, said method comprising the steps of:

detecting an occurrence and time interval of said reference signal in said bit stream;

comparing the time interval from the reference signal in said bit stream with the predetermined time interval threshold; and inserting from reference signal storage a reference signal into said bit stream when said time interval exceeds said pre-determined time interval threshold.

11. A method as in claim 10, wherein the steps of detecting and comparing are carried out by a reference signal detection means.

12. A method as in claim 10, wherein said bit stream is a sequence of components, each component having a varying length, and each component including timing information indicating when a receiving device must process said component.

13. A method as in claim 12, wherein the step of inserting includes the further steps of:

retrieving a reference signal only component from said reference signal storage; and imprinting said reference signal only component with reference signal information from a clock.

14. A method as in claim 12, wherein said components are digitally encoded video images.

15. A method as in claim 14, wherein said video images are encoded according to the MPEG-2 standard.

16. A method as in claim 10, wherein said predetermined time interval threshold is between 20 and 200 milliseconds.

17. A method as in claim 10, wherein said predetermined time interval threshold is approximately 40 milliseconds.

18. A method for assuring delivery of a program clock reference signal within a predefined time interval threshold in a bit stream which is output at a variable rate, said method comprising the steps of:

detecting an occurrence and time interval of said program clock reference signal in said bit stream;

comparing the time interval from the program clock reference signal in said bit stream with the predetermined time interval threshold; and inserting from reference signal storage a program clock reference signal into said bit stream when said time interval exceeds said pre-determined time interval threshold.

19. A method as in claim 18, wherein the steps of detecting and comparing are carried out by a reference signal detection means.

20. A method as in claim 18, wherein said bit stream is a sequence of components, each component having a varying length, and each component including timing information indicating the device clock when the bit stream is originated.

21. A method as in claim 20, wherein the step of inserting includes the further steps of:

retrieving a program clock reference signal only component from said reference signal storage; and imprinting said reference signal only component with reference signal information from a local clock.

22. A method as in claim 20, wherein said components are digitally encoded video images.

23. A method as in claim 22, wherein said video images are encoded according to the MPEG-2 standard.

24. A method as in claim 18, wherein said predetermined time interval threshold is approximately 40 milliseconds.

25. An apparatus for encoding a bit stream, outputting said bit stream at a variable rate, and delivering a program clock reference signal within said bit stream, said apparatus comprising:

means for outputting an encoded bit stream;

detector means for detecting the presence of said program clock reference signal in said encoded bit stream, and measuring a time interval between occurrences of said program clock reference signal; and program clock reference signal insertion means for inserting said program clock reference signal into said encoded bit stream when the time interval exceeds a maximum threshold interval.

26. An apparatus as in claim 25, wherein said bit stream is a sequence of components, each component having a varying length, and each component including timing information indicating the device clock when the bit stream is originated.

27. An apparatus as in claim 26, wherein said components are digitally encoded video images.

28. An apparatus as in claim 27, wherein said video images are encoded according to the MPEG-2 standard.

29. An apparatus as in claim 25, further including:

storage means for storing a program clock reference signal component; and program clock reference value insertion means for imprinting a clock generated program clock reference signal from a clock coupled to said means for outputting an encoded bit stream onto said program clock reference signal component.

30. An apparatus as in claim 25, wherein said time interval is approximately 40 milliseconds.

* * * * *

UNITED STATES PATENT AND TRADEMARK OFFICE
CERTIFICATE OF CORRECTION

PATENT NO. : 6,546,013 B1
DATED : April 8, 2003
INVENTOR(S) : Huang et al.

It is certified that error appears in the above-identified patent and that said Letters Patent is hereby corrected as shown below:

Title page,
Item [63], Related U.S. Application Data, delete "6,052,584" and insert therefore -- 6,052,384 --

Column 1,
Line 10, delete "6,052,584" and insert therefore -- 6,052,384 --

Column 2,
Line 5, delete "constants" and insert therefore -- constant, --

Column 5,
Line 37, insert therefore
-- BRIEF SUMMARY OF THE INVENTION
   Not Applicable --

Column 6,
Line 58, delete "in" between "information" and "found" and insert therefore -- is --
Line 59, delete "Pocketsized" and insert therefore -- Packetsized --

Column 8,
Line 25, after "milliseconds.", insert the following:
-- In general however, the time interval for $T_{PCR}$ packet is on the order of between 20 and 200 milliseconds, and typically approximately 40 milliseconds. --

Signed and Sealed this

Twenty-sixth Day of August, 2003

JAMES E. ROGAN
*Director of the United States Patent and Trademark Office*